United States Patent [19]

Baumann et al.

[11] 4,267,569

[45] May 12, 1981

[54] MICRO-COMPUTER SYSTEM FOR CONTROL AND DIAGNOSIS OF MOTOR VEHICLE FUNCTIONS

[75] Inventors: Heinrich Baumann, Schwieberdingen; Günther Schmidt, Ludwigsburg, both of Fed. Rep. of Germany

[73] Assignee: Robert Bosch GmbH, Stuttgart, Fed. Rep. of Germany

[21] Appl. No.: 42,359

[22] Filed: May 25, 1979

[30] Foreign Application Priority Data

Jun. 2, 1978 [DE] Fed. Rep. of Germany ....... 2824190

[51] Int. Cl.[3] ...................... G06F 15/20; G05B 15/02; F02D 5/02

[52] U.S. Cl. .................................... 364/431; 364/424; 73/116; 123/417; 324/379

[58] Field of Search ............... 364/424, 425, 551, 200, 364/900, 431; 324/378-380; 73/116, 117.2, 117.3; 340/151, 52 F, 53; 123/117 D, 32 EA, 32 EB

[56] References Cited

U.S. PATENT DOCUMENTS

| | | | |
|---|---|---|---|
| 3,882,305 | 5/1975 | Johnstone | 364/200 |
| 3,906,205 | 9/1975 | Yoshida et al. | 364/431 |
| 3,906,207 | 9/1975 | Rivere et al. | 364/425 |
| 4,061,025 | 12/1977 | Willenbecher et al. | 73/116 |
| 4,072,850 | 2/1978 | McGlynn | 340/53 |
| 4,082,069 | 4/1978 | Mayer | 123/117 D |
| 4,125,894 | 11/1978 | Cashel et al. | 73/117.2 |
| 4,128,005 | 12/1978 | Arnston et al. | 73/117.3 |
| 4,205,377 | 5/1980 | Oyama et al. | 364/431 |

*Primary Examiner*—Charles E. Atkinson
*Assistant Examiner*—Gary Chin
*Attorney, Agent, or Firm*—Frishauf, Holtz, Goodman & Woodward

[57] ABSTRACT

In order to permit diagnosis of operation and function parameters in a motor vehicle which is equipped with an electronic microprocessor control system without the necessity of providing in the diagnostic equipment substantial additional memory capability, the control system includes a sub-program for diagnosis. A first subprogram executed by the control system in response to a command from the diagnostic equipment gives the appropriate actual operational data to the diagnostic equipment. A second subprogram simulates nominal values for specific vehicle data under various operating conditions and compares these with the actual values. The resulting information is given to an operator by a display and can additionally include various instructions, e.g. repair instructions or a trouble shooting sequence based on the diagnosis.

9 Claims, 2 Drawing Figures

MICRO-COMPUTER SYSTEM FOR CONTROL AND DIAGNOSIS OF MOTOR VEHICLE FUNCTIONS

The present invention relates to a motor vehicle control apparatus which has a micro-processor to control operating functions, and more particularly to apparatus which can be used for diagnosis of the functions of the vehicle.

BACKGROUND AND PRIOR ART

Micro-processor controls for automobiles and other motor vehicles are known and are described, for example, in the following technical literature: "Electronics", Jan. 20, 1977, page 102 ff; "Electronic Design", No. 1, Jan. 4, 1977, p. 34 ff; SAE-paper No. 750432, "Application of Microprocessors to the Automobile", p. 65 ff; "Elektrotechnische Zeitschrift", vol. 28, 1976, No. 15, p. 496 ff; "Computer", August 1974, page 33 ff.

In addition, hard-wired calculators for controlling the functions in a motor vehicle or in a combustion engine are known, e.g. from the U.S. Pat. No. 4,082,069 (corresponding to U.S. application Ser. No. 660,858, filed Feb. 24, 1976), MAYER et al.

Diagnostic equipment for connection to sensors in motor vehicles is known. Such diagnostic equipment is connected by means of an intermediate plug which can be plugged into a matching socket in the vehicle. The sensors deliver their signals directly to the diagnostic equipment. There, after being converted, shaped and processed, if necessary, these signals are displayed or processed further. Such diagnostic equipment often is complex and costly and is generally suited only for checking relatively few operational parameters or sensors in the powered vehicle.

THE INVENTION

It is an object to provide an apparatus for controlling motor vehicle functions which are dependent on operational parameters and are repeated, especially those serving to determine the ignition, the injection of fuel, and possibly other functions, and monitoring the effectiveness of the controller.

Briefly, a micro-computer system of the vehicle and installed thereon has an on-board microprocessor connected by a data bus and an addressing bus to each of at least a fixed-value memory (Read-only memory—ROM, programmable read-only memory—PROM; eraseable PROM-EPROM), a working memory (Random Access Memory—RAM), and an input-output unit to which there are connected control elements to control operation of vehicle functional elements, the internal or external signal sources to provide signals to the microprocessor, and preparation circuits for signals dependent on operational parameters. All these elements are part of the operational, functional, and control components of the motor vehicle itself. The input-/output unit, including a process-channel mechanism of the micro-computer system is connected to diagnostic equipment through which it can be given a diagnosis command, so that specific vehicle data in accordance with a diagnostic program can be given to the diagnostic equipment. The system includes apparatus to furnish a subprogram which can take data stored in the memory against which actual operations are checked to thereby derive diagnostic data.

The apparatus in accordance with the invention has the advantage that motor vehicles which are equipped with a microcomputer system can be checked relatively simple. The subprogram in the main program permits interrogation or checking of various sensing locations and the corresponding values can then be displayed or further processed.

The diagnostic subprogram thereby requires only a limited number of storage places in the already present memories of the micro-computer system.

The number of storage places needed in the micro-computer system of the vehicle can be substantially reduced by using diagnostic equipment in combination with a control device with a micro-processor and a memory connected thereto since the required diagnostic program can in large part also be put into these memories.

Drawings, illustrating a preferred embodiment, wherein.

Figure 1:
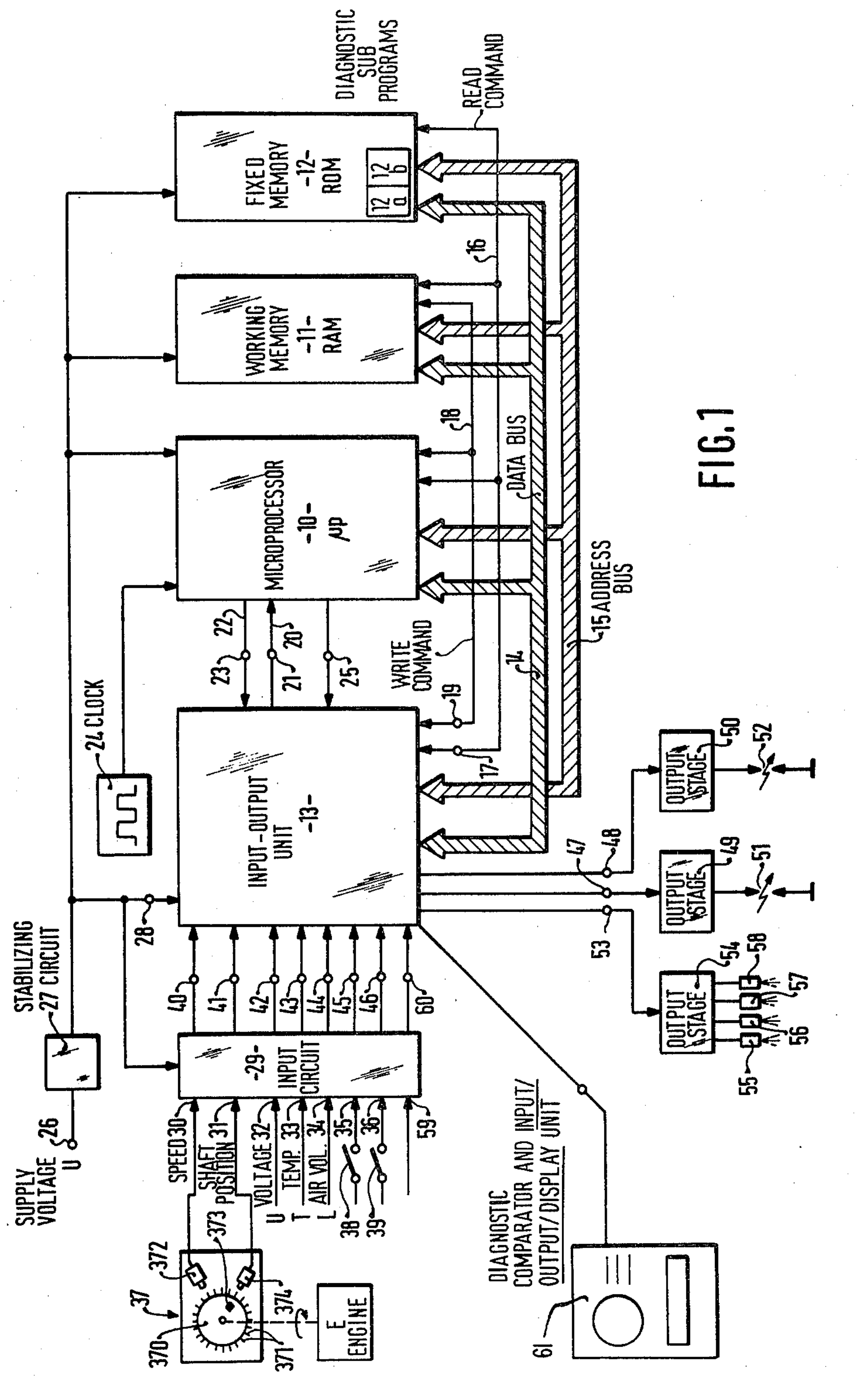
FIG. 1 is a simplified block circuit diagram of a micro-computer system for a motor vehicle with diagnostic equipment connected to an input/output unit.

In the micro-computer system illustrated in FIG. 1, a microprocessor 10 is connected through a data bus 14 and an address bus 15 to a working memory (RAM) 11, a fixed value memory (ROM, PROM or EPROM) 12, and an input/output unit 13. Depending upon the content of the information to be transmitted, or upon the number of addresses which can be selected, the data bus 14 can consist of, e.g. 8 individual lines and the address bus 15 can consist of, e.g. 16 individual lines. A read-command line 16 which connects the component elements 10 to 12 is connected by a terminal 17 with the input/output unit 13 and serves to read-out applied or stored information. A write-command line 18 connecting the component elements 10, 11 is likewise connected by a terminal 19 to the input/output unit 13 and serves to read-in information into the memory 11. A program interrupt-command line 20 leads from the input/output unit 13 over a terminal 21 to the microprocessor 10. This line serves to interrupt a program just running in the microprocessor upon presence of previously predetermined information. A clear-command line 22 leads from the microprocessor over a terminal 23 to the input-/output unit 13. It serves to provide certain initial conditions, e.g. for the beginning of a program. A frequency generator 24 is connected with the microprocessor 10 via a terminal 25 to provide this component with a basic time or clock frequency. A frequency, preferably derived from the clock by division, is connected from processor 10 preferably via a terminal 25 to the input/output unit 13. A terminal 26 leading to a supply voltage is connected to a stabilizing circuit 27. The stabilized output voltage of this circuit is led to a terminal 28, as well as to various component elements which have electronic circuit equipment.

An input circuit 29 has eight inputs 30 to 36 and 59 which are connected to external signal sources. The input 59 can thus be connected, e.g. with a simple switch which gives a diagnosis command to the micro-computer system. The instantantaneous condition, e.g. of an internal combustion engine, is reported to the computer system by means of the signal source. A transducer arrangement 37 is connected with the inputs 30, 31. Transducer 37 has a star-wheel 370 which is coupled to the crankshaft of a combustion engine E; it has a plurality of teeth or projections 371 arranged on its periphery. These teeth are sensed by a first pickup 372. Each ferromagnetic tooth generates a flux change in the inductive pickup 372 which results in a voltage signal. The resulting signal, which is dependent upon the speed of rotation, is fed to the input 30. A reference marker 373 is provided on the wheel 370. The reference marker 373 is sensed by a second pickup 374 and the reference mark or crankshaft position signal is fed to the input 31. Further information from the combustion engine or the vehicle with which it is used is applied to the inputs 32 to 36. Input 32 provides a supply voltage U signal; Input 33 a temperature T signal; input 34 intake air volume (per unit time) L signal; input 35 throttle plate setting signal, e.g. by a switch 38, and input 39 a signal representative of position of the starting switch of the engine. The extent of the operational conditions of the engine can be expanded as desired and is not limited to the information presented above, e.g. may include exhaust gas data.

The presented input function signals at the inputs 30 to 36 are processed, noise limited, or filtered, and digitalized in the input circuit as necessary. At the output side this information is led via the terminals 40 to 46 and 60 to the input/output unit 13. To the extent that the information is presented in analog form at the input circuit 29, it is converted into digital signals by means of one or more analog-digital converters in the input circuit 29. Signal wave shaping can also be carried out, e.g. by Schmitt triggers. Two end stage outputs of the input-/output unit are connected via terminals 47, 48 with switching end stages 49, 50 which are designed as ignition output stages. Such ignition output stages include, in a known manner, a semiconductor switch in the primary circuit of an ignition coil system. At least one ignition path 51, 52 or one spark plug is connected in the secondary current circuit of the ignition system. A further output switching stage 54 for controlling fuel injection through injection valves 55 to 58 (four are illustrated) is likewise connected to the input/output unit 13. Further functions of the motor vehicle can also be controlled or regulated by the input/output unit 13, for example an electronic transmission control, a vehicle brake, or a level control, or other controlled functions.

OPERATION

The general mode of operation of a microprocessor system such as that presented here is readily apparent to those skilled in the art. Reference is made to DE-OS No. 2732781 (corresponding to U.S. application Ser. No. 916,827, filed June 19, 1978, now U.S. Pat. No. 4,204,256, May 20, 1980 Klötzner assigned to the assignee of this application).

Information applied externally to the input/output unit 13 is processed together with fixed memory information by the microprocessor 10, within the scope of a program stored in the fixed memory 12. The computed results which here are the signals for controlling the ignition and for fuel injection, are transferred to the output switching stages 49, 50, 54 and used for carrying out the desired switching commands. Final and intermediate values are in part stored in the working memory 11 and then retrieved and processed as necessary by the microprocessor, as known.

The number of microprocessors, fixed value memories, and working memories used is not limited by the illustration of FIG. 1, but can be expanded as desired, independently of the information to be processed, the scope of the program, and the scope of the stored data. The number is, of course, dependent on the type of components used in each case, or on their operational and memory capabilities.

In accordance with the invention, a diagnostic arrangement is connected to the input/output unit 13 which features, for example, a known type of visual data display device, a picture tube, and/or an indicating device for the operational instructions, and/or a connection for a printer. When a diagnosis command, for example derived externally from an operator-controlled switch, periodically during operation of the vehicle based on time or distance travelled, or generated by the diagnostic program itself, is given to the input/output unit via the input 59 and the terminal 60, then a diagnosis of operation of engine and/or the vehicle is carried out with a subprogram stored a section 12*a* of the read-only memory 12. With this diagnosis program, the information of interest is given serially to the diagnostic equipment 61 through the input/output unit 13.

The data and test values specific to the motor vehicle can include, for instance, actual test or go/no-go limit values according to a first diagnostic subprogram, e.g. the rotational speed, the battery voltage, the transmission rotational speed (by an input to stage 29, which is not shown), or the like. The test values can be obtained, for example, by means of a test value source connected at 59 to the input circuit 29. By means of a second diagnosis subprogram, which is stored in section 12*b* of the read-only memory, the computed values of, e.g. the ignition advance angle, the dwell angle, the fuel injection time, or the like, can be individually read and transmitted through the input/output unit 13 to the diagnostic equipment 61. Limit values can be stored in memory 12.

Certain operating conditions of the combustion engine which are particularly suited for diagnostic purposes, such as for example idling, can be simulated in accordance with the diagnosis subprogram by generation of certain input signals. The thus presented values and the then computed operational data by the microcomputer system can likewise be picked up and applied to the diagnostic equipment 61 through the input/output unit 13.

In accordance with the data in the subprogram stored in the read-only memory 12, command and actual value comparisons can also be carried out with the help of the microcomputer system. An error indication derived therefrom can be applied to the display of diagnostic equipment 61 through the input/output unit 13. In such command or nominal-actual comparisons, the nominal or command or desired vehicle specification and operation data is stored in the read-only memory 12.

For diagnosis of this type, with which the motor vehicle or the electrical equipment of the motor vehicle can be tested for proper functioning, there is required only simple and known diagnostic equipment which can be connected with the microcomputer system with only two additional lines. By means of the described equipment, there is possible a simple diagnosis which is independent of the then pertaining use of the vehicle, since all the testing conditions can be automatically entered in accordance with a particular diagnosis program. The unit 61 functions essentially as a comparator for the diagnostic program data with actual function dependent vehicle data, or derived, computed data, applied thereto by the respective buses 14, 15. The nominal-actual value comparison for computed output data takes place in the microcomputer system, i.e. the diagnosis is no longer specific to a specific engine or a specific motor vehicle. Instruction and use tables for the diagnostic equipment can set forth to the operator, in addition to engine data, information regarding defects which may have appeared, and which repairs should be made and/or which parts ordered replaced. Such tables can also be stored in memory 12, at the cost of expanded storage capability.

Figure 2:
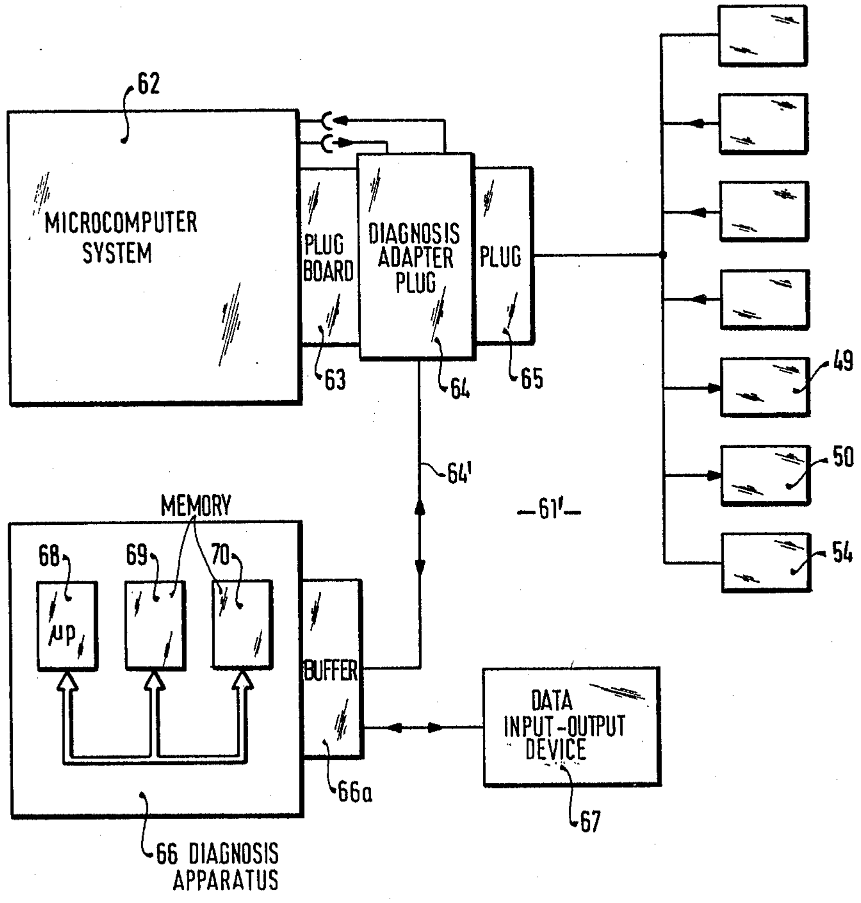
FIG. 2 is a simplified block circuit diagram of a micro-computer system with diagnostic equipment connected thereto which has output units capable of working from a diagnosis program.

FIG. 2 shows the microcomputer system of FIG. 1 as a single block 62. Microcomputer system 62 includes the input/output unit 13, the microprocessor 10, and the memories 11 and 12. Various sensors are connected to the microcomputer system 62 by means of a plug board 63, a diagnosis adapter plug 64, and a plug connector 65. Commands, such as to the ignition stages 49 and 50, as well as to the injection equipment 54, can be given over the same components. Diagnostic equipment 61' has a diagnostic apparatus 66, connected over a buffer **66*a* with the data input/output device 67, and is also connected over buffer 66*a* and bus 64' with the diagnosis connection adapter plug 64. The diagnostic equipment itself also has a control apparatus similar in principle to the system 62, that is, the system of FIG. 1, with its own microprocessor 68 and its own memories 69 and 70 corresponding to memories 11, 12. The diagnostic program can be stored in large part in the memories 69 and 70, so that only a small number of additional storage places need be added to the microprocessor system 62 of the vehicle. This system permits control of elements 49, 50, 54 by the diagnostic apparatus and enhances reliability, while providing for extensive trouble shooting data upon failure or malfunction of a unit in the microcomputer system 62**.

Testing of the various functions of the operational parameters of the motor vehicle is carried out basically similarly to the operation of the arrangement in accordance with FIG. 1. There is additionally offered, however, the possibility of testing or monitoring and checking, and indicating various parameters, and the operation of the micro-computer system 62 of the motor vehicle regarding its processing of the respective data, and operating signals. The data supplied to the motor vehicle sensors are edited, e.g. suitably wave-shaped, filtered, digitized and the like, and processed for use in the diagnostic equipment 66 for a diagnosis program running therein. The signals representing these data generate data which are compared with those of the microcomputer system 62. Defective sources can be quickly located even when the microprocessor system 62 itself is defective. The input/output apparatus 67, connected with the diagnostic equipment 66, can store and read out a wide range of instructions or information to the testing operator which may require extensive memory storage. For example, a diagram for a trouble shooting search, a replacement parts list, or a service instruction for the vehicle can be stored and then read out, or displayed.

The electronic apparatus of the motor vehicle, and consequent operation thereof, can easily be monitored. Besides the existing microcomputer systems, there are required only additional memory locations for a diagnostic program and only an indicating or output apparatus, of any suitable known type; providing an additional microprocessor 68 great expands the capability of supervision and permits practically automatic trouble-shooting.

Complete and careful checking of operation of a motor vehicle or the electrical equipment thereof is thus made possible at relatively small expense.

In an illustrative embodiment, the following elements were used:

input/output unit 13: RCA 87665 A
microprocessor 10: RCA 87085 A
working memory RAM 11: RCA 88088
fixed memory ROM 12/: RCA 88027 . . . 30
data input/output device 61: teletype, data terminal (monitor) or any other device with RS 232 C signal levels or a 20 mA current loop interface. Unit 61 is a standard data input/output device with e.g. a RS 232 C interface.

We claim:

1. In a motor vehicle, the combination of apparatus forming part of the motor vehicle for electronically controlling functional elements of the vehicle and their operating functions including at least one of: ignition firing; fuel injection, wherein the apparatus includes an on-board microcomputer system (62) comprising a microprocessor unit (10), at least one fixed value memory unit (12-ROM, PROM, EPROM) storing operating and function data of the vehicle, a working memory unit (11-RAM), an input/output unit (13), a data bus (14) and an address bus (15), said buses interconnecting said units;

at least one signal source (U, T, L, 30-39) coupled to a functional element of the motor vehicle and a signal processing circuit (29) connected to the respective signal source and providing one or more vehicle function parameter-dependent signals to the input/output unit (13);

and at least one output element (47-58) connected to and controlled by said input/output unit, coupled to a functional element of the motor vehicle and controlling an operating function of the vehicle;

with a monitoring and supervisory apparatus connectable to receive at least one vehicle function parameter-dependent signal derived from at least one of said signal sources, including a diagnostic equipment unit (61) connected to the input/output unit (13) and having a comparison diagnostic unit (61);

means (**12*a*, 12b) forming part of said fixed value memory unit (12) of the on-board microcomputer system (62) for storing data representative of a diagnostic program including data representative of predetermined operating functions and diagnosis test command data, and connection means (14,15) for selectively connecting (a) data representative of the diagnostic program into said microcomputer system (62) for processing in accordance with the diagnosis test command data; and (b) data representative of predetermined operating functions to said input/output unit (13) and connection of at least one output element to the diagnostic equipment unit (66) to permit control of the respective output element from the stored data representative of said functions upon failure or malfunction of or in said microcomputer system (62**) or in one of said signal sources.

2. Apparatus according to claim 1, wherein said connection means to furnish the diagnostic program includes said buses (14, 15) and the diagnostic program is furnished to the microprocessor unit (10).

3. Apparatus according to claim 1, wherein the connection means (14, 15) connect the vehicle function parameter-dependent signals to the diagnostic equipment unit (61) for comparison therein with said predetermined operating function data stored in the diagnostic program.

4. Apparatus according to claim 1, wherein the storage means include a storage section (12*b*) storing a diagnosis subprogram providing data representative of desired function parameter-dependent signals, and said connection means (14, 15) provide said data representative of desired function parameter-dependent signals and data computed by said microprocessor unit (10) to said diagnostic unit for comparison therein and to enable checking of the output of the microprocessor unit (10) against said desired data.

5. Apparatus according to claim 1, wherein the storage means (12*a*, 12*b*) stores data representative of simulated vehicle function-parameter dependent conditions of the vehicle, and said connection means (14, 15) applies said simulated data to the comparison diagnostic unit (61).

6. Apparatus according to claim 1, wherein the fixed value memory unit (12) stores command data representative of function parameter-dependent values;

and said diagnostic comparison unit (61) compares said command value with values determined in accordance with said stored diagnostic program to provide diagnostic output data based on the comparison of actual function parameter-dependent data with respect to desired or commanded data.

7. In a motor vehicle, the combination of apparatus forming part of the motor vehicle for electronically controlling functional elements of the vehicle and their operating functions including at least one of: ignition firing; fuel injection, wherein the apparatus includes an on-board microcomputer system (62) comprising a microprocessor unit (10), at least one fixed value memory unit (12-ROM, PROM, EPROM) storing operating and function data of the vehicle, a working memory unit (11-RAM), an input/output unit (13), a data bus (14) and an address bus (15), said buses interconnecting said units;

at least one signal source (U, T, L, 30-39) coupled to a functional element of the motor vehicle and a signal processing circuit (29) connected to the respective signal source and providing one or more vehicle function parameter-dependent signals to the input/output unit (13);

and at least one output element (47-58) connected to and controlled by said input/output unit, coupled to a functional element of the motor vehicle and controlling an operating function of the vehicle;

with a monitoring and supervisory apparatus connectable to receive at least one vehicle function parameter-depending signal derived from at least one of said signal sources within said apparatus forming part of the motor vehicle, including a diagnostic equipment unit (66) connected to the input/output unit (13) and having a comparison diagnostic unit (68);

means (69, 70) storing data representative of a diagnostic program including data representative of predetermined operating functions and diagnosis test command data;

connection means (63, 64, 65, 64′) connecting said diagnostic equipment unit to receive one or more vehicle function parameter-dependent signals;

said connection means further (a) selectively connecting the diagnostic program into said microcomputer system (62) for processing in accordance with the diagnosis test command data and providing respective vehicle function parameter-dependent signals to the input/output unit (13) to affect a respective functional element of the motor vehicle, said connection means establishing communication with the respective functional element to permit supervision of the response of the respective functional element in accordance with the processed diagnosis test command data whereby the operation of the microcomputer system (62) as well as at least one signal source forming part of the motor vehicle and the respective functional element forming part of the motor vehicle can be checked and possible malfunction diagnosed; and (b) selectively providing connection of said input/output unit (13) of the microcomputer system (62) to the diagnostic equipment unit (66) and connection of at least one output element to the diagnostic equipment unit (66) to permit control of the respective output element from the stored data representative of said functions upon failure or malfunction of or in said microcomputer system (62) or in one of said signal sources.

8. Apparatus according to claim 7, wherein the diagnostic equipment unit (66) includes a data output device (67) providing human operator-legible output data representative of the diagnostic comparison effected in said diagnostic microprocessor unit (68).

9. Apparatus according to claim 7, wherein the storage means (70) include stored data providing remedial information based on the nature of the comparison in said diagnostic microprocessor unit (68) if said comparison indicates deviation of the actual data from the stored diagnostic data requiring remedial action.

* * * * *